May 5, 1970 J. C. MARSH, JR 3,510,579

TRANSISTORIZED AUTOMATIC-GAIN-CONTROLLED AMPLIFIER

Filed Dec. 28, 1967

INVENTOR
James C. Marsh, Jr.

BY Eugene M. Whitacre

ATTORNEY

United States Patent Office 3,510,579
Patented May 5, 1970

3,510,579
TRANSISTORIZED AUTOMATIC-GAIN-CONTROLLED AMPLIFIER

James Courtland Marsh, Jr., Indianapolis, Ind., assignor to RCA Corporation, a corporation of Delaware Filed Dec. 28, 1967, Ser. No. 694,132
Int. Cl. H03g 3/30; H04n 5/56
U.S. Cl. 178—7.3 10 Claims

ABSTRACT OF THE DISCLOSURE

A gain controlled bandpass amplifier includes two amplifier stages arranged in a series direct current biasing configuration and a cascade alternating current configuration. Gain control is applied by means of a third transistor in a manner to maintain the circuit impedances of the bandpass amplifier substantially constant over the automatic gain control range.

Figure 1:
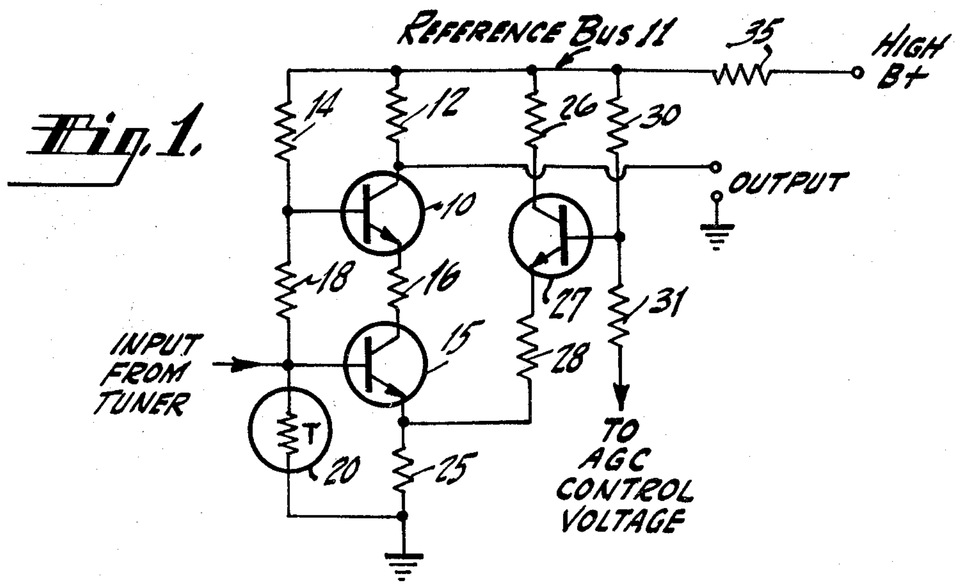

The present invention relates to transistorized television signal processing means and more particularly to an improved amplifier configuration incorporating automatic gain control.

It is common practice in the design of television or radio receivers to provide an automatic gain control (AGC) circuit which controls the overall gain of the receiver as a function of the received signal strength. Basically AGC is implemented by producing a control voltage or current which is proportional to the signal strength and utilizing this to control the gain of the radio frequency or intermediate frequency amplifiers or both. In this manner signal levels in the receiver are maintained substantially constant to provide a uniform, good quality picture or sound or both. When using AGC techniques in transistorized equipments one has to be sure that the AGC control voltage or current does not appreciably change circuit conditions in a manner to cause undesired changes in impedances. For example, it is known in the art that potential changes between the electrodes or current changes through the electrodes of a transistor serve to change the effective impedance, both resistive and reactive, between such electrodes. If the transistor is employed in a tuned or selective amplifier configuration such changes will alter the resonance characteristic or bandpass of the tuned circuit. Such effects become more pronounced in color television receivers because of the strict requirements imposed on the circuits utilized therein concerning phase and amplitude distortions. Therefore for color receivers, in general, it is desired to maintain the bandpass characteristic curve, for example, of an I.F. amplifier, as uniform as possible while subjecting the amplifier incorporated therein to the full AGC signal. These attributes apply as well to automatic color control or ACC amplifiers which operate in the chrominance portion of a color receiver. Here the amplitude of the signal is controlled in a manner analogous to AGC by developing a control voltage or current which is proportional to the amplitude of the color information received, as for example, the amplitude of the color burst appearing on the back porch of the horizontal sync pulse during a color transmission. The problem of maintaining substantially constant bias on transistors further becomes complicated in that the power supplies or sources available in such receivers, or those desired to be used in such equipment, are usually non-regulated due to economical considerations. Therefore, the outputs of these supplies may vary with line voltage or with load. In addition to the unregulated supply certain equipments are hybird in design, contain vacuum tubes as well as transistors, and in such units the unregulated supplies are usually of a relatively high potential compared to the electrode breakdown ratings associated with readily available and economical transistors.

One skilled in the prior art may neutralize the output of a selective amplifier with an AGC control, to mask the effects of bias changes from affecting circuit operation. Other techniques employ complicated coupling schemes to obtain stable amplitude and phase characteristics with the application of AGC or ACC. Still other solutions require regulated power supplies or reference elements, as Zener diodes and so on, to operate with such high level or unregulated supplies.

In order to accomplish AGC or ACC control while maintaining bandwidth stability the present invention employs two transistor selective amplifier stages arranged in cascade for alternating current signals and in a series direct current biasing path. The direct current biasing path includes at least one common resistance across which a constant specified voltage is maintained. By controlling the current through this series path in accordance with an AGC signal the selective stages are made to draw more or less current, the excess or deficiency being supplied by the AGC circuit in a manner to increase or decrease the gain of the stages while maintaining the voltage across the common resistance and the selective stages relatively constant, causing substantially little change in the transistor's impedances. This serves to maintain the bandwidth substantially constant as being fundamentally determined by the selective circuits employed therein.

Figure 2:
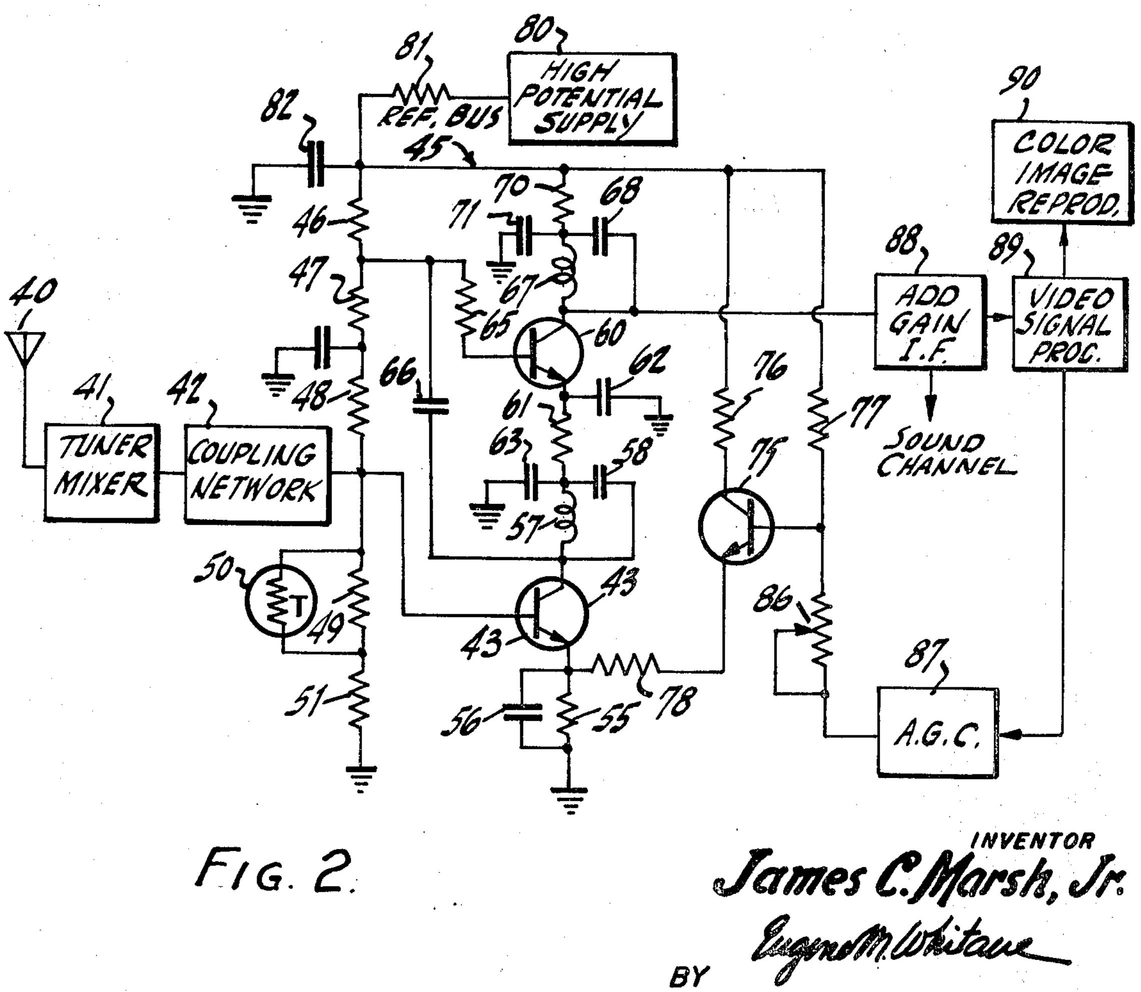

FIG. 1 is a direct current equivalent circuit diagram of a gain controlled amplifier; and FIG. 2 is a schematic circuit diagram, partly in block form of a television receiver including a gain controlled intermediate frequency amplifier embodying this invention.

The equivalent circuit diagram of FIG. 1 includes a pair of like conductivity transistors 10 and 15 connected in series with resistors 12, 16 and 25 between a reference bus 11 and ground. Base biasing voltages for the transistors 10 and 15 is provided by a voltage divider including the thermistor 20 and resistors 14 and 18 all connected in series between the reference bus 11 and ground.

Signals from a source not shown are applied to the base of the transistor 15 and amplified signals are derived from the collector electrode of transistor 10. The gain of the stages including transistors 10 and 15 is controlled by a AGC transistor 27 which is connected in series with a pair of resistors 26 and 28 between the emitter electrode of the transistor 15 and the reference bus 11. Biasing voltages for the AGC transistor 27 are provided by a voltage divider including a pair of resistors 30 and 31 connected between the reference bus and a source of AGC voltage, not shown.

The reference bus 11 is connected through a resistor 35 to a source of operating potential indicated as B+.

In operation, the circuit is arranged so that substantially constant current flows through the resistor 25. The base biasing voltage resistors 14, 18 and 20 are designed to provide a relatively constant voltage at the base electrode of the transistor 15, and the total base-emitter bias voltage is the difference between the voltage drops across the thermistor 20 and the resistor 25.

At one extreme the constant current through the resistor 25 may flow through the transistors 15 and 10 in series to the exclusion of the AGC transistor 27. At the opposite extreme, the AGC transistor 27 may carry substantially all of the resistor 25 current. The amount of current through the transistors 10 and 15 determines the gain of the circuit, and this current in turn is determined by the AGC voltage applied to the transistor 27. Since the current through the resistor 25 is substantially constant over the AGC range, the current through the resistor 35 is also substantially constant. This means that the direct voltage at the reference bus 11 does not change as the AGC voltage changes. In the same manner the voltage across the transistors is substantially constant and the current limiting resistors 12 and 16 are selected such that the voltage drop across them is small compared to the voltage on the reference bus 11. Because the voltage drop across transistors 10 and 15 is held relatively constant it may be of a fairly high magnitude without exceeding the reverse collector breakdown of the transistors 10 and 15. The transistors 10 and 15 are biased in the range such that as the current through them goes down the gain goes up. This characteristic is sometimes referred to in the art as forward biased mode gain control. Such devices, properly biased, then exhibit an increase in gain with a decrease in current through them. It is understood and known that a transistor operating in this mode with a relatively high voltage across it behaves with improved cross modulation characteristics. Because the voltage is held substantially constant over the AGC ranges any variations of interelectrode capacity are greatly minimized. Hence if transistors 10 and 15 include resonant circuits as their collector loads, the resonant characteristics or bandpass response of the circuit will remain relatively stable over the entire AGC control range. It is also understood that the resistors 12 and 16 can actually exhibit some voltage variation over the AGC range but this variation can be limited by proper design so as to afford operation, at a point in the transistors' 10 and 15 characteristics to afford minimum capacitance variation. The circuit described above, provdes the following advantages: (1) the bandpass characteristic becomes predominately a function of the tuned circuits employed in the collector loads of the transistors because the interelectrode reactance is substantially constant over the AGC range; (2) the forward bias mode utilized serves to minimize cross-modulation; (3) the transistors 10 and 15 can be operated at relatively high collector voltages permitting a relatively high maximum gain; (4) a single AGC control lead is used to control the gain of two stages, which gain is the cascade gain for alternating single frequencies.

Referring now to FIG. 2 there is shown a partial schematic circuit and block diagram of a color television receiver utilizing an intermediate frequency amplifier in accordance with this invention.

Signals captured by the antenna 40 are coupled to a television tuner 41 where they are converted to corresponding signals of intermediate frequency. The tuner 41 is coupled by a suitable network 42 to an intermediate frequency amplifier employing the invention. Specifically the coupling network 42 is connected to the base electrode of a transistor 43. Biasing for the base of transistor 43 is furnished from a voltage divider comprising resistors 46, 47, 48, resistor 49 in parallel with thermistor 50 and resistor 51; the above combination connected in series between the reference bus 45 and a source of reference potential such as ground. Base bias for transistor 43 is taken from the junction point formed by resistor 48 with the parallel combination of resistor 49 and thermistor 50. The emitter electrode of transistor 43 is coupled to ground through a resistor 55 which is bypassed by capacitor 56 for high frequency. The collector electrode of transistor 43 is coupled to a parallel resonant circuit consisting of a coil 57 and a capacitor 58. The coil 57 and capacitor 58 are selected to resonate at a frequency within the range of 42.7 to 45.75 MHz. which approximately represents the intermediate frequency amplifier's bandpass. The other terminal of the parallel resonant circuit, comprising inductor 57 and capacitor 58, is coupled to the emitter electrode of a transistor 60 via a resistor 61 which is decoupled at both terminals by separate capacitors 62 and 63. The base electrode of transistor 60 is returned to the junction of resistors 46 and 47 comprising a portion of the series voltage divider via a current limiting resistor 65 for DC base biasing. The signal drive for transistor 60 is obtained by a coupling capacitor 66 having one terminal coupled between the junction of the current limiting resistor 65 and the resistors 46 and 47. The other terminal of capacitor 66 is coupled to the collector electrode of transistor 43. In this manner the stages while in series for DC biasing are in cascade for the AC signal coupled through capacitor 66. The collector electrode of transistor 60 is coupled to one terminal of a parallel resonant circuit comprising inductor 67 and capacitor 68. The center frequency of this parallel resonant circuit is also selected to resonate between 42.7 to 45.75 MHz. and in combination with the first resonant circuit, comprising inductor 57 and capacitor 58, serves to shape the bandpass of the IF. These two resonant circuits may be stagger tuned to provide the overall desired IF bandpass characteristic. The other terminal of the parallel resonant circuit comprising inductor 67 and capacitor 68, is coupled to the reference supply bus 45 through a resistor 70 which is decoupled by a capacitor 71. Also shown coupled to the reference supply bus 45 is the collector and base electrodes of the AGC transistor 75; which electrodes are coupled via resistors 76 and 77 respectively. The emitter electrode of the AGC transistor 75 is coupled to the common emitter resistor 55 through a current limiting resistor 78 thereby providing a ground return path for current through the AGC transistor 75.

The reference bus 45 is returned to a source of high potential 80 through a dropping resistor 81 which is decoupled at the reference supply bus by capacitor 82. If one considers all circuit inductances as short circuits and capacitors as open circuits for direct current purposes it is readily apparent that the circuit shown in FIG. 2 can be represented as having the direct current equivalent already described and discussed in FIG. 1. In this manner the DC voltage appearing on the reference supply bus 45 is substantially constant over the entire AGC and the voltage across transistors 60 and 61 are held substantially constant by the circuit, so that the inter-electrode reactive imepdances remain substantially constant over the desired range. Therefore the AGC signal does not, to any great extent, alter the bandpass characteristic of the IF stages which is primarily determined by the parallel resonant circuits. The bandpass characteristic of these stages is substantially independent of the AGC control signal and the optimum response characteristic is achieved for the entire AGC range. Such operating conditions are important in the color receiver as the shape of the IF curve must be such so that it provides proper amplification at the high frequency end for the color subcarrier and its sidebands. Shown coupled to the base of transistor 75 through a potentiometer 86 is the automatic gain control circuit 87. The transistors 43 and 60 are biased so as the current through them goes down, because of that current contributed by the AGC transistor 75, the gain of the IF goes up in order to maintain as nearly a constant signal level as possible to the additional IF stage 88 and the video signal processing circuitry 89. The gain controlled output from this IF amplifier is taken from the collector electrode of transistor 60 which is coupled to an additional IF stage 88 for further amplification. The IF is then split up in this stage 88 into a video and sound channel. The video channel is coupled to the video signal processor 89 while the luminance component of the signal is amplified while the color signal components are demodulated to obtain color difference signals. After matrixing the appropriate signals are coupled to the color image reproducer 90 for display as a color presentation. AGC circuit 87 may be coupled to the video detector found in the video signal processing circuit 89 and this signal can then be used as a reference to determine the strength of the signal captured by the antenna 40; or a signal obtained from an appropriate video stage in the processor 89 can be used instead. Usually the AGC circuit 87 is of the keyed type in order to discriminate against noise and other spurious signals. Operation of such AGC systems and color television receivers in general are known in the art and not considered to be part of this invention.

A circuit designed in accordance with the above description operated as a video IF amplifier with gain control using the following valve components for those shown in FIG. 2.

High potential supply 80—+405 v.
Voltage on reference bus 45—+80 volts
Resistor 81—8600Ω, 18 w.
Capacitor 82—20 μfd.
Resistors 70, 61—1000Ω
Resistor 46—3900Ω
Resistor 47—1800Ω
Resistor 48—2200Ω
Resistor 49—10,000Ω
Thermistor 50
Resistor 55—3600Ω
Resistor 78—3900Ω
Resistor 76—1800Ω
Resistor 77—330,000Ω
Variable resistor 86—1,500,000Ω
Resistor 65—33Ω
Capacitor 82—20 μfd.
Capacitors 62 and 63—.001μfd.
Capacitor 56—.001 μfd.
Capacitor 68—51 μμf.
Capacitor 58—56 μμf.
Capacitor 66—10 μμf.
Capacitor 71—1000 μμf.
Inductor 67—5½ turns #22
Inductor 57—4½ turns #22
Transistors 43 and 60—SE5055
Transistor 75—2N3694

The above circuit possessed an IF gain of —40db with approximately 7 milliamperes of current through transistors 43 and 60. The AGC transistor 75 could supply 0–7 ma. of current over the entire AGC range thereby achieving a gain variation of about 60 db over this range. The IF bandpass characteristic extended from 42.17 MHz. to 45.75 MHz. at 6 db was down about —50 db at 41.25 MHz. and remained fairly constant within these limits over most of the AGC range.

What is claimed is:

1. A gain controlled amplifier for use in a television signal processing path comprising, (a) first and second transistors, each having an alternating current gain which is a function of the direct current therethru, said first and second transistors having their collector to emitter junctions in a series direct current biasing path, (b) means coupling said first and second transistors in cascade for television signals, and (c) a third transistor having its collector to emitter junction in direct current shunt with a portion of said series biasing path for varying the direct current through said series path in a direction to alter said cascade gain of said first and second transistors to said television signals.

2. A gain controlled amplifier for use in a television signal processing path, comprising, (a) first and second transistors, each having an alternating current gain which is a function of the direct current flowing through them, said first and second transistors having their collector to emitter junctions in a series direct current path which includes a specified resistance coupling said transistors collector to emitter junctions to a point of reference potential, (b) means coupling said first and second transistors in cascade for television signals, (c) a third transistor having its collector to emitter junction in shunt with a portion of said series path formed by said collector to emitter junctions of said first and second transistors, and also having its emitter coupled to said point of reference potential through said specified resistance, and (d) means coupled to the base of said third transistor for varying the current through said third transistor's emitter to collector junction and therefore through said specified resistance to cause said direct current through said first and second transistors and therefore said alternating curent gain to vary in accordance with said current through said third transistor.

3. A gain controlled, selective bandwidth amplifier for use in television signal processing path comprising, first and second transistors having their collector to emitter junctions in a series direct current biasing path, where said first and second transistors are biased in their operating regions at a point where a decrease in direct current through said series path results in an increase in alternating current gain, means coupling said first and second transistors in cascade for television signals, and means coupled to said series path for varying the direct current through said series path to alter the gain of said first and second transistors to said television signals while maintaining said bandwidth substantially constant.

4. In a selective bandpass gain controlled amplifier employing transistors for use in a television signal processing path, where voltage variations across said transistors cause impedance variations between said transistor electrodes which serve to change said bandpass, said television signal processing path including an automatic gain control signal producing circuit to monitor said television signal and provide a control signal proportional to the strength thereof, the combination therewith comprising, (a) a first terminal;

(b) a second terminal;

(c) a first circuit connected between said first and second terminals, said first circuit including, first and second transistors each having base, emitter and collector electrodes, first and second resonant tank assemblies each having a specified resonance characteristic determined by said selective bandpass wherein said first resonant tank assembly is coupled between said first terminal and said first transistor's collector electrode, said second resonant assembly coupled between said first transistor's emitter electrode and said second transistor's collector electrode, an alternating current coupling element coupled between the base electrode of said first transistor and the collector electrode of said second transistor, an emitter resistor coupling the emitter of said second transistor to said second terminal, a voltage divider having a point thereon coupled to the base of said first transistor and a second point coupled to the base of said second transistor, said divider and said emitter resistor serving to bias said first and second transistors in a region of their characteristics where a decrease in current through said collector to emitter junctions of said transistors causes an increase in the alternating current gain of said transistors, (d) means coupled between said first terminal and said emitter resistor, said means responsive to said automatic gain control signal for controlling the gain of said first and second transistors by varying the current through said first circuit in a manner to maintain said specified resonance characteristic of said tank assemblies substantially fixed irrespective of said change in gain.

5. The apparatus according to claim 4 wherein said means coupled between said first terminal and said emitter resistor is a third transistor having its collector coupled to said first terminal and its emitter coupled to said emitter resistor, said third transistor's base including means adapted to be coupled to said automatic gain control signal producing circuit.

6. A gain controlled amplifier for use in a television signal processing path, said television signal processing path including an AGC circuit which produces a control signal proportional to the strength of the signal received by said receiver, comprising, (a) first and second transistors each having a base, emitter and collector electrode, (b) a unidirectional source having one terminal of a given potential and a second terminal of a reference potential for biasing said transistors in a series path wherein the emitter electrode of said first transistor is coupled to the collector electrode of said second transistor and the emitter electrode of said second transistor is coupled through a resistor to said reference potential terminal, said collector electrode of said first transistor being coupled to said given potential terminal; said biasing means, including said resistor, further serving to bias said transistors in an operating region wherein a decrease in current flowing through said series path results in an increase in the gain of said first and second transistors, (c) active means responsive to said AGC control signal coupled to said resistor for introducing a current therethrough to cause that current supplied by said first and second transistors to decrease in proportion to that current supplied by said active means resulting in an increase in gain in accordance with said AGC control signal.

7. A transistorized gain controlled amplifier having a given bandpass characteristic for use in a television signal processing path, wherein said television signal processing path includes an AGC circuit which produces a control signal proportional to the intensity of said television signal received, said amplifier comprising, (a) first and second transistors each having a base, emitter and collector electrode, (b) first and second parallel resonant cricuits designed to accommodate said given bandpass characteristic, (c) a source of biasing potential, (d) means for coupling said first parallel resonant circuit between said first transistor's collector electrode and said source of biasing potential, (e) means for coupling said second parallel resonant circuit between said first transistor's emitter electrode and said second transistor's collector electrode, (f) a resistor coupled between said emitter electrode of said second transistor and a point of potential referenced to said biasing potential to form with said first and second transistor collector to emitter junctions a series path with said source of potential, (g) means coupled between said first and second transistors' base electrodes and said source of biasing potential to bias said transistors in a region wherein a decrease of current through said collector to emitter junctions results in an increase in gain, said means further serving to maintain a specified voltage across said resistor, (h) means coupled between said collector electrode of said second transistor and said base electrode of said first transistor for providing a path therebetween for said television signals, (i) means responsive to said control signal coupled to said resistor for introducing current therethrough in a manner to maintain said given voltage by causing said first and second transistors to decrease current conduction and therefore increase gain in accordance with said introduced current, said maintenance of said given voltage further serving to maintain said given bandpass characteristic substantially independent of the current through and therefore the gain of said first and second transistors.

8. In combination:

(a) a first resonant circuit, (b) a second resonant circuit, (c) first and second transistors each having a base, collector and emitter electrode, (d) means for coupling said first resonant circuit between the collector of said second transistor and the emitter of said first transistor, (e) a source of unidirectional potential, (f) means, including a voltage dropping resistor, for coupling said second resonant circuit between the collector of said first transistor and said source, (g) an emitter impedance for returning said second transistor's emitter to a point of refernce potential, (h) means, including a relatively low impedance voltage divider, coupled to said voltage dropping resistor for biasing said base electrodes of said first and second transistors in a manner to develop a specified voltage drops across said emitter impedance and specified voltage drops across said first and second transistors' collector to emitter junctions, (i) active means coupled to said emitter impedance for varying the current therethrough while serving to maintain the voltage across said impedance and said specified voltage drops across said first and second transistors' collector to emitter junctions relatively constant whereby any current through said first and second transistors' collector to emitter junctions decreases in accordance with that current supplied by said active means.

9. A transistorized intermediate frequency amplifier for use in a color television receiver, said receiver having a television signal processing path including means for producing a control signal according to the intensity of a television signal received, comprising:

(a) first and second terminals, (b) first and second resonant circuits having a composite bandwidth capable of accommodating color television intermediate frequency signals, (c) first and second transistors, each having a base, emitter and collector electrode, arranged between said first and second terminals with their collector to emitter junctions in a direct current series path including said first resonant circuit coupled between the collector of said first transistor and said first terminal, said second resonant circuit coupled between said emitter electrode of said first transistor and said collector electrode of said second transistor, said direct current series path further including a predominantly resistive impedance coupled between said second transistor's emitter and said second terminal, said first and second transistors biased to operate in a region where a decrease of current through said collector to emitter junctions results in an increase of alternating current gain, (d) means coupled to the base of said second transistor adapted to receive color intermediate frequency television signals, (e) means coupled to said second transistor's emitter and responsive to said control signal to vary the current through said series path serving to vary the alternating current gain of said first and second transistors and hence the magnitude of said color intermediate frequency television signals while substantially maintaining said composite bandwidth constant.

10. In an automatic gain controlled transistorized amplifier for use in a television signal processing path, said path including means for providing a control voltage proportional to the intensity of said television signal, said transistors capable of exhibiting capacitance variations between their electrodes with changes in voltage across them, the improvement therewith comprising, (a) a first terminal, (b) a second terminal, (c) a first circuit connected between said first and second terminals, said first circuit including first and second transistors each having a base, emitter and collector electrode wherein said emitter electrode of said first transistor is coupled to said collector electrode of said second transistor and said collector electrode of said first transistor is coupled to said first terminal, (d) a resistor coupled between the emitter of said second transistor and said second terminal, (e) a second circuit comprising a resistive voltage divider coupled between said first and second terminals, the base of said first transistor coupled to a point on said divider, the base of said second transistor coupled to another point on said divider closer to said second terminal, (f) a third circuit, including a third transistor having a base, emitter and collector electrode, coupled between said first and second terminals via said third transistor's collector electrode coupled to said first terminal and said emitter electrode coupled to said second terminal through said resistor, (g) means for coupling said first and second terminals between a relatively high unidirectional potential source to provide a relatively constant potential across said first and second terminals irrespective of the regulation of said high unidirectional potential source, and, (h) means for applying said control voltage to said third transistor's base to vary the current through said first circuit while maintaining the voltage across said first and second transistors substantially constant whereby any capacitance variations between their electrodes are substantially minimized.

References Cited

UNITED STATES PATENTS 2,926,307 2/1960 Ehret ---------------- 330—19

ROBERT L. GRIFFIN, Primary Examiner

J. C. MARTIN, Assistant Examiner

U.S. Cl. X.R.

330—29